July 16, 1968 R. W. CRUGER ET AL 3,392,938
ARRESTING GEAR TAPE
Filed Jan. 19, 1966 3 Sheets-Sheet 1
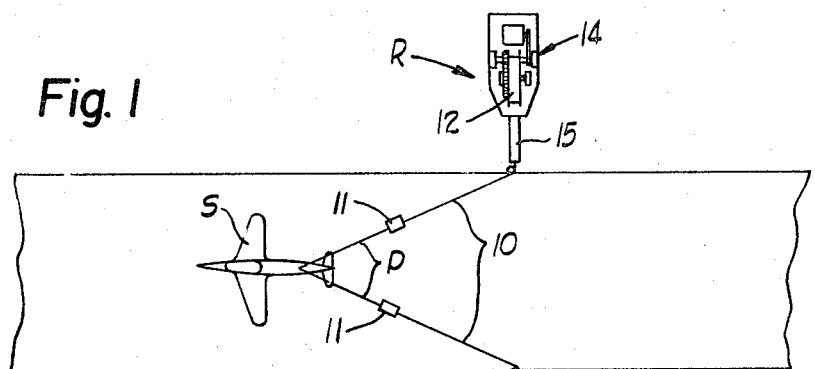
Fig. 1
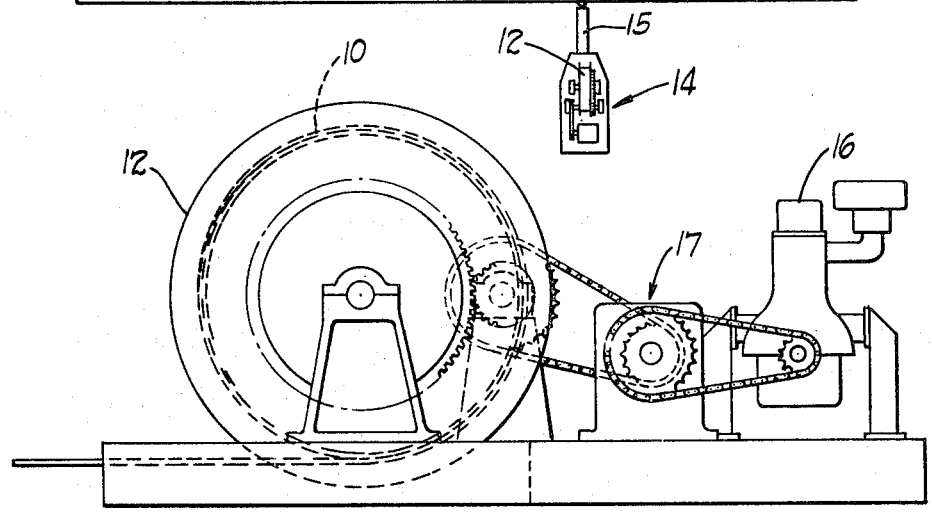
Fig. 2
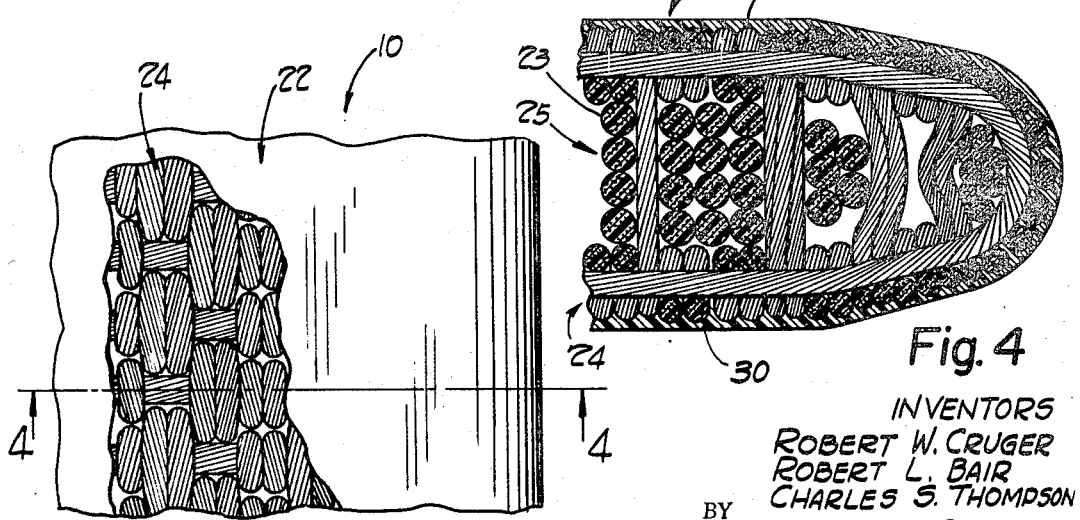
Fig. 3
Fig. 4
INVENTORS
ROBERT W. CRUGER
ROBERT L. BAIR
CHARLES S. THOMPSON
BY
Meyer, Tilberry & Body
ATTORNEYS

INVENTORS
ROBERT W. CRUGER
ROBERT L. BAIR
CHARLES S. THOMPSON

BY

ATTORNEYS.

July 16, 1968 R. W. CRUGER ET AL 3,392,938
ARRESTING GEAR TAPE
Filed Jan. 19, 1966 3 Sheets-Sheet 3

INVENTORS.
ROBERT W. CRUGER
ROBERT L. BAIR
CHARLES S. THOMPSON
BY
ATTORNEYS.

United States Patent Office

3,392,938
Patented July 16, 1968

3,392,938
ARRESTING GEAR TAPE
Robert W. Cruger, Springfield, Pa., and Robert L. Bair, Ashland, and Charles S. Thompson, Vincetown, N.J., assignors to E. W. Bliss Company, Canton, Ohio, a corporation of Delaware
Filed Jan. 19, 1966, Ser. No. 521,741
10 Claims. (Cl. 244—110)

ABSTRACT OF THE DISCLOSURE

The disclosure relates to an improvement in arresting gear tape and more particularly to a woven textile tape having an elastomeric coating the physical properties of which are designed to improve dynamic tape performance. In essence, an elastomeric coating having a substantially uniform static, sliding, wet and dry coefficient of friction with respect to adjacent coiled tape surfaces has been found to permit a much more uniform tension on the tape while being uncoiled under load.

---

During arrestment, an aircraft, or other fast-moving object, is engaged by an arresting member, such as a net or steel pendant, which is connected at its opposite ends to an energy absorber by means of the subject tape. An energy absorber of the type to which the invention particularly pertains includes energy dissipating means in association with a rotatable payout reel upon which several hundred feet of purchase tape are coiled. In operation the tape is uncoiled from the reel against the restraining torque of the energy dissipating means, such as a friction or water brake, until the forward motion of the aircraft is arrested.

The tape in its preferred embodiment is a fabric member having a protective elastomeric coating adhering to its surfaces. However, it should be appreciated that the invention has much broader applications and is equally useful whether the tape is regarded as a coated fabric tape, or is more properly regarded as a tape formed as an entirely molded, extruded or rolled elastomeric matrix having longitudinally extending load bearing strands bonded therein.

To overcome the problem of wear encountered with a woven fabric tape, an abrasion resistant elastomeric coating is bonded to the fabric forming a protective envelope to prevent scuffing and fraying. While the coating increases tape life, it has been found that the physical properties of the coating, such as hardness and coefficient of friction, differ substantially from those of an uncoated fabric tape. As a result, heretofore, the use of coatings has caused a drastic increase in the severity of a problem known as "stick-slip," particularly for aircraft engagements at high arresting loads.

Stick-slip is a term which refers to the behavior of tape being uncoiled under load at a controlled rate. By way of explanation, during arrestment the tape is paid out under high tension, but in contrast, is rewound upon the reel under virtually no load conditions resulting in a relatively loosely coiled tape stack. As a result of this looseness, a cinching down or tightening of the tape stack occurs during arrestment, which action is superimposed on the reel controlled tape payout thus feeding an uncontrolled amount of tape into the system in excess of the normal arresting rate as determined by the energy absorbing capacity of the energy dissipating means. If the cinching action is erratic so as to be marked by an abrupt "slip," at which point the running end of the tape goes slack momentarily, followed by a "stick" when the cinching action is completed, the resulting deleterious fluctuation in tape tension is transmitted to the aircraft when the slack is consumed. In severe instances of stick-slip, the rise in tape tension at the moment of "stick" can be of a magnitude considerably exceeding the allowable stress limits of the aircraft with resulting undesirable consequences.

The present invention ameliorates these and other difficulties by the provision of a tape having an elastomeric surface, the physical properties of which are such as to reduce the effects of stick-slip.

In accordance with the invention, a tape is provided with an elastomeric material on each of its opposite flat surfaces having a substantially uniform coefficient of friction of not greater than 0.4 with respect to adjacent surfaces of tape.

Further in accordance with the invention, the tape is a fabric member woven of synthetic yarn having an elastomeric coating bonded thereto, the coating being curable at a moderate temperature so as to avoid damage to the fabric member and having a coefficient of friction in the cured state of about 0.2 and a hardness of in excess of 40 Durometers on the Shore D scale.

In another aspect of the invention, a tape is molded from a curable elastomer having longitudinally extending load bearing strands bonded therein, which strands have a modulus of elasticity greater than that of the elastomeric tape matrix in its cured state.

Further in accordance with the invention, the coefficient of friction of the elastomeric coating or matrix can be reduced through the use of additives, such as Teflon, to provide better tape payout performance.

The main object of the invention is to provide a tape, the physical properties of which are suited to the control of stick-slip in arresting applications.

Another object is to provide a tough, abrasion resistant elastomeric coating for a fabric tape wherein the coating has the necessary coefficient of friction and hardness to insure a uniform cinching action of the tape stack.

Another object is to provide an elastomer having additives mixed therein prior to curing which have the effect of further improving the nonstick-slip properties of the elastomer in the cured state.

Still another object is to provide a molded or extruded tape having longitudinally extending reinforcing strands bonded in an elastomeric matrix having the requisite nonstick-slip properties in the cured state.

These and other objects will become apparent by referring to the following descriptions and drawings, wherein:

FIGURE 1 is a schematic plan view of an illustrative aircraft arresting installation showing a plane in the process of being arrested by two reel and energy dissipating arresting engines on opposite sides of the runway;

FIGURE 2 is a side elevational view of one of the reel and arresting engines depicted in FIGURE 1 showing a retraction engine and chain driven transmission mechanism used for turning the reel to rewind the tape after arrestment;

FIGURE 3 is an enlarged plan view of a marginal edge section of a purchase tape having a nonstick-slip coating thereon showing a portion of the coating cut away to illustrate the weave of the fabric underneath;

FIGURE 4 is an enlarged sectional view of the coated tape shown in FIGURE 3 taken along line 4—4;

Figure 5:
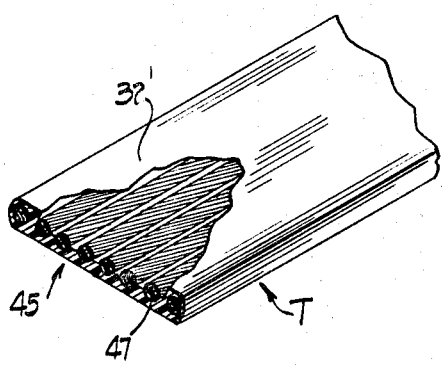
FIGURE 5 is a partial view of a modification of the invention showing a molded purchase tape having a plurality of high strength synthetic reinforcing strands bonded in a nonstick-slip elastomeric matrix.

Referring now to the drawings wherein the figures are for the purposes of illustrating a prefered embodiment of the invention only, and not for the purposes of limiting same, FIGURE 1 shows in more or less schematic form an aircraft S in the process of being arrested by energy absorbing gear R which includes a steel pendant P arranged to be intercepted by an incoming aircraft S and energy dissipating arresting engines 14 installed on opposite sides of the runway. The aircraft S has means thereon, such as a tailhook, for engaging the pendant P while in flight. The pendant P is connected at each end to tapes 10 by means of suitable tape-to-pendant connectors 11. In the standby or battery position, the pendant P is stretched taut across the runway and each purchase tape 10 is wound on a reel 12 of the arresting engines 14. Upon engagement by the plane S with the pendant P, the tapes 10 are paid out simultaneously through suitable guide ducts and sheaves, generally indicated at 15. After the plane has been brought to a stop, the pendant P is unhooked and rewind motors 16, associated with each arresting engine 14, are engaged to rotate the reels 12 in the opposite direction so as to rewind the tapes 10 and restore the pendant P to the battery position in readiness for the next arrestment.

In the embodiment of the invention shown in FIGURES 3 and 4 each fabric tape 10 has a coating 22 bonded thereto. In the actual case, a representative tape as presently known may be from seven to fifteen inches in width, approximately a quarter of an inch thick and hundreds of feet in length, thus it will be appreciated that FIGURES 3 and 4 are considerably enlarged. In FIGURE 3 only a marginal edge portion of a tape 10 is shown with the coating 22 broken away to illustrate the weave pattern of the tape underneath. FIGURE 4 is an enlarged sectional view taken along line 4—4 of FIGURE 3, and it should be understood, the apparent voids between strands in FIGURES 3 and 4 would not be present in the tightly packed weave of an actual tape.

Each tape 10 in the preferred embodiment of the invention is of the type known as stuffer weave tape having a large number of longitudinally extending stuffer warp strands 23 and a protective casing or envelope 24. The strands 23 are grouped into parallel rows of strength bundles 25 arranged across the tape which serve as the primary load bearing elements for transmitting the braking torque to the aircraft. The coating 22 is applied directly to the surface of the tape in liquid form and thereafter hardens by curing at temperatures of around 200° F.–300° F. to form a tough, scuff resistant coating intimately bonded throughout the length and breadth of the casing 24.

As described more in detail hereinafter, the coating 22 is applied preferably by a continuous process at a uniform thickness of not greater than about five mils so as to provide flat top and bottom tape surfaces 30. While the tape 10 is wide in relation to its thickness, it nevertheless is sufficiently stiff in a transverse direction so that it may be coiled, layer upon layer, as shown in FIGURE 2, without individual wraps rolling up at the edges due to stack compression or slipping off into the space between the reel and tape stack as the tape is being uncoiled under load.

Figure 6:
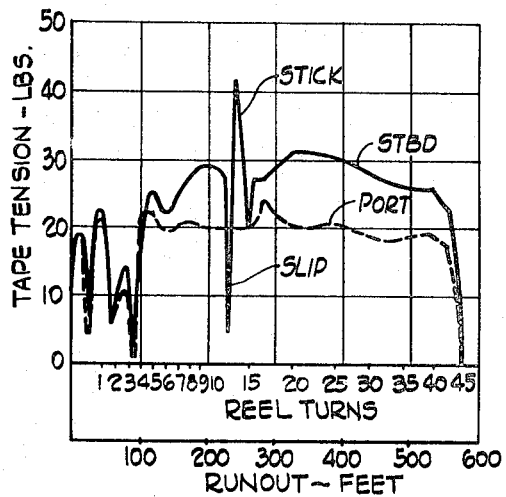
FIGURE 6 is a graph illustrating the relationship of tape tension to aircraft runout for arresting engines of the type shown in FIGURE 1 with one incident of severe stick-slip being shown in the starboard arresting engine section.

Heretofore, as previously mentioned, when attempts were made to coat fabric tapes to protect them from abrasion, the frequency and magnitude of stick-slip increased. FIGURE 6 is a plot of an arresting gear performance showing starboard and port tape tensions versus reel turns and aircraft runout in feet where a severe incident of stick-slip is observed occurring approximately midway during arrestment in the starboard tape. This is manifested by a sudden drop in tape tension at the moment of slip followed by a sharp increase considerably in excess of the average tape tension when stick occurs. Though the mechanics of stick-slip are not fully understood, stick-slip is believed to be due to an erratic feed-in of tape due to coil looseness, which feed-in is superimposed on the normal tape payout controlled by the energy dissipating means. As a result of this uncontrolled feed-in, a sudden slackening occurs at the running end of the tape with the result that tape tension, which is the force causing reel rotation, lessen momentarily. Since the full brake torque of the energy dissipating means is still being applied to the reel when the tension suddenly drops, the reel slows down and in severe cases, may even lock. However, when the excess feed-in is consumed by aircraft runout, tape tension reappears, but with the reel slowing down or possibly locked, the effect is to cause a tremendous increase in tension often far in excess of the normal allowable tension value. While it is possible to eliminate stick-slip by rewinding the tapes under substantially the same tension as they are paid out, such a solution to the stick-slip problem in a purely arresting installation would require auxiliary equipment which it is the purpose of this invention to render unnecessary. Thus, rather than attempting to eliminate tape stack looseness altogether, it is the principal object of the present invention to control the payout of elastomer surfaced tapes such that any excess feed-in is accomplished in a uniform manner.

In order to accomplish uniform feed-in with coated tapes, for example, it has been found that the physical properties of the coating play a significant role in eliminating the effects of stick-slip. Thus, the coating 22 must be sufficiently hard when cured to avoid any tendency toward tackiness on the surfaces 30 with respect to adjacent tape wraps. The importance of this will be realized when it is appreciated that if there is a tendency for adjacent tape surfaces 30 to adhere when coiled, then not only is relative sliding movement between tape wraps prevented, thus impairing the cinching process, but if the tendency to adhere exceeds the strength of the bond between the coating 22 and the fabric casing 24 underneath, then the coating will be torn free in spots as the tape is uncoiled. Also the coating should be sufficiently hard to provide the necessary resistance to plastic flow when squeezed between tape layers under prevailing stack pressure. Thus it has been found that a satisfactory nonstick-slip coating should have a hardness in excess of 40 Durometers on the Shore D scale.

Even more important than hardness for a nonstick-slip coating is the coefficient of friction between adjacent surfaces 30. In this connection and as provided in the invention, the coefficient of friction should not exceed 0.4 between adjacent coated tape surfaces 30 over static, sliding, wet and dry conditions as measured according to an approved procedure outlined below.

A nonstick-slip elastomer coating material which has been found satisfactory for aircraft arresting uses is a product available from the Elastomer Chemicals Department of the E. I. du Pont de Nemours & Co., Wilmington 98, Del., sold under the trademark Adiprene L-213 or LD-213, the properties of which are described in detail in the Du Pont Development Products Report No. 16, dated September 1959. LD–213 is identified as a liquid urethane elastomer having a curing temperature of between 200° and 300° F. and a curing time of between a half and one hour when cured with a suitable daimine curing agent such as Moca, also available from Du Pont. Table 1 below gives the effect of mixing and curing temperatures on the physical properties of a Moca cured LD–213.

TABLE 1.—MOCA CURING SYSTEMS FOR LD-213

| Compound: | | | | |
|---|---|---|---|---|
| LD-213 | 100 | 100 | 100 | 100 |
| Moca | 29 | 25 | 20 | 15 |
| Mixing and Curing Conditions: | | | | |
| Mixing temperature,° F | 175 | 175 | 175 | 175 |
| Pot life, min | 2 | 3 | 4 | 5 |
| Molding time, min | 5 | 7 | 10 | 10 |
| Cure | 1 hour at 212° F. | | | |
| Aftercure | 7 days at 75° F. | | | |
| Physical Properties: | | | | |
| Yield Point, p.s.i | 4,100 | 3,575 | | |
| 100% Modulus, p.s.i | 3,500 | 3,800 | 3,600 | 2,500 |
| Tensile Strength, p.s.i | 7,500 | 7,500 | 6,000 | 3,000 |
| Elongation, percent | 250 | 250 | 200 | 230 |
| Hardness, Shore D | 74 | 78 | 70 | 65 |
| Resilience, percent | 48 | 50 | 50 | 48 |
| Impact resistance, ft. lb./in | 2 | 4 | 10 | Flexed |
| Flexural Modulus, p.s.i | 100,000 | 110,000 | 65,000 | 15,000 |
| Compression set, Method A, percent | 45 | 50 | 50 | 40 |
| Abrasion index | 275 | 350 | 250 | 220 |
| Compression for 5% Deflection, p.s.i | 1,400 | 1,300 | 1,150 | 975 |

Figure 10:
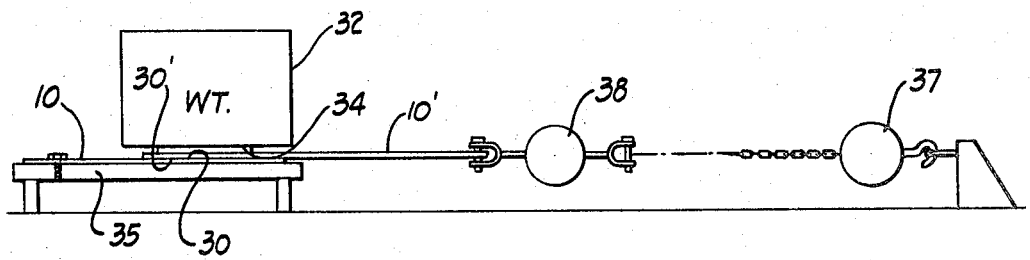
FIGURE 10 is a diagram depicting an approved manner of obtaining values for coefficients of friction on tape surfaces under the various test conditions; and, FIGURE 11 is a schematic diagram of an apparatus which may be used in applying a coating at a uniform thickness.

Referring now to FIGURE 10, the procedure for determining values of coefficients of friction as referred to and claimed herein involves placing a weight 32 upon a steel plate 34 which is in turn placed upon overlapping portions of two test lengths of the tape 10, 10' each coated with a nonstick-slip coating 22 such as LD–213. It is important that the area of plate 34 be small in relation to the mass of weight 32 so that high pressure readings are obtained and in this connection, it is suggested that the plate 34 be approximately 7" square and that weight 32 be a minimum of about 1250 pounds. The bottom tape 10 is held flat on a fixture 35, and has its upper surface 30 in direct contact with the bottom surface 30' of the upper tape 10' which is connected at one end to a chain hoist 37. The pulling force for static, sliding, wet and dry conditions from which the coefficient of friction may be calculated is obtained by reading a dynamometer 38 connected between the chain hoist 37 and the upper tape 10'. By wet, the meaning is that the adjacent surfaces 30, 30' of the test tapes 10, 10' in contact with each other are moist to the touch, while by dry, reference is to the fact that they are dry to the touch though some moisture is undoubtedly present. By moisture, the meaning is that water is present on the surfaces rather than some other liquid. By static and sliding, reference is made to the usual definition of these terms in relation to determining coefficients of friction where static friction is that force which opposes motion when there is no slipping between surfaces, while sliding friction is that force which opposes motion when there is relative movement between two surfaces. The value of static friction referred to herein is that obtained just prior to slip occurring between tape surfaces 30, 30' in the test installation illustrated while the value for sliding friction is that obtained when there is relative movement between tape surfaces 30, 30'.

It should be appreciated that LD–213 is merely one example of a coating having a hardness and coefficient of friction which falls within the limits specified and considered essential for a nonstick-slip coating and that so long as the coating has these requisite physical properties, the fact that it is chemically considered a plastic or an elastomer makes little difference. The coefficients of friction determined as depicted in FIGURE 10 for static sliding, wet, and dry conditions of LD–213 are illustrated in FIGURE 8.

Figure 7:
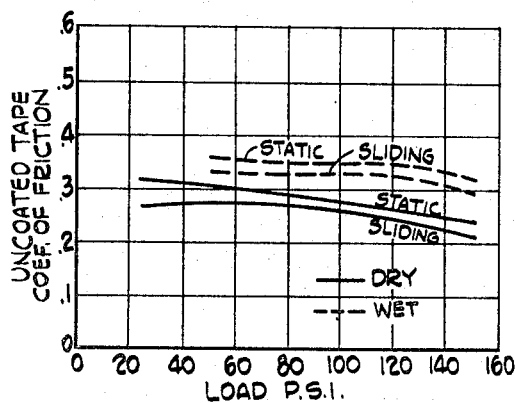
FIGURE 7 is a set of curves showing the friction characteristics of uncoated woven synthetic fabric tape for various test conditions.
Figure 8:
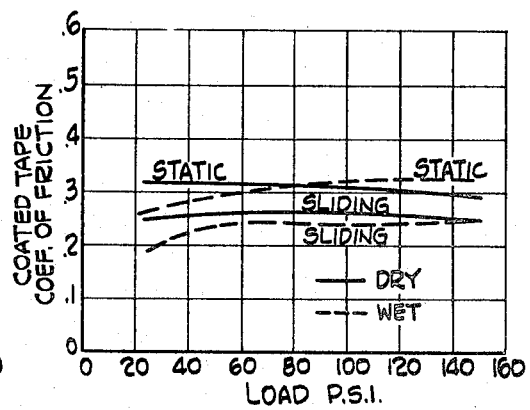
FIGURE 8 is a set of curves showing the friction characteristics under the same conditions for a tape coated or molded in accordance with the invention.

In FIGURE 8, the dotted line curves represent static and sliding coefficients under wet conditions while the solid line curves represent the same information under dry conditions. It may be seen that the average coefficient of friction is uniform over varying loads and deviates only between 0.2 and 0.3 over the various test conditions and in no case exceeds 0.4. As a comparison, the same information was determined for plain uncoated woven nylon tape known to have favorable nonstick-slip characteristics and the coefficients of friction obtained for the same test conditions are plotted in FIGURE 7. It should be noted, however, that the coefficients of friction curves for the tape coated with LD–213 are more uniform and generally of a lower value than those obtained for the uncoated nylon fabric tape.

Figure 9:
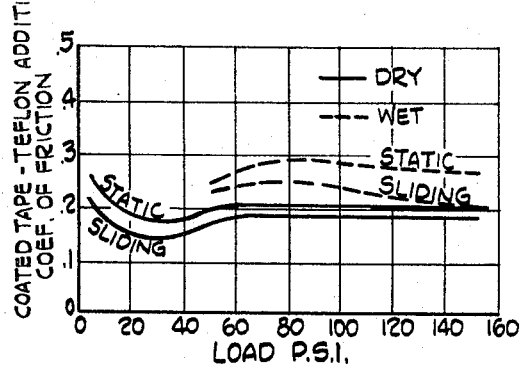
FIGURE 9 is a set of curves showing the friction properties of a nonstick-slip elastomer which has been modified by an additive to have a lower coefficient of friction.

FIGURE 9 illustrates similar information for an LD–213 coating having Teflon particles present as an additive. In accordance with the invention, the coefficient of friction of nonstick-slip elastomer coatings may be even further improved by introducing certain additives to the uncured mix. Additives which have been found beneficial are graphite and Teflon particles introduced in granular form into the liquid elastomer prior to curing. In FIGURE 9 the static, sliding, wet, and dry coefficients of friction for a tape coated with an elastomer having Teflon cured therein are shown. In this instance the wet and dry coefficients of friction both static and sliding are lower than those for the LD–213 coated tape having no Teflon particles present (FIGURE 8).

Figure 11:
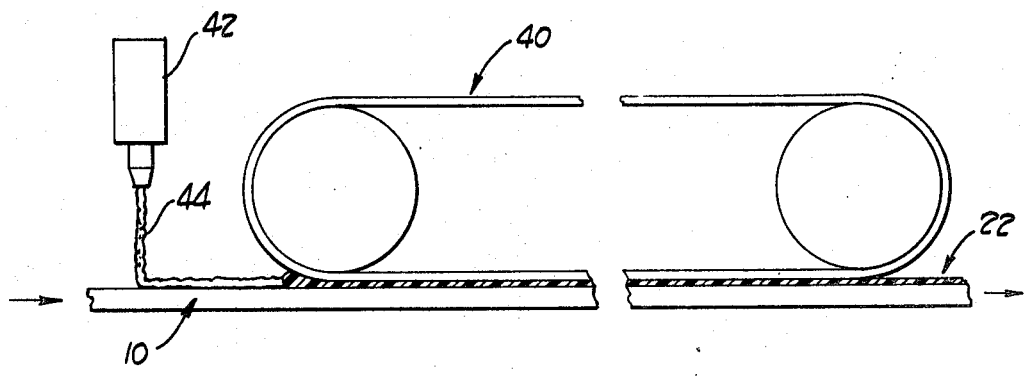

Referring now to FIGURE 11, a process for applying and curing coating 22 on the tape is illustrated wherein a continuous belt apparatus 40 is housed in an oven (not shown) through which the uncoated fabric tape 10 is passed. A nozzle 42 delivers the liquid elastomer such as LD–213 onto the center of the tape 10 in a continuous stream 44. The viscosity of the elastomer as it leaves the nozzle 42 is such that it can be easily spread to the opposite edges of the tape by the action of the continuous belt apparatus 40 which is adjusted to rotate at the linear speed of the tape. Depending upon the particular curing agent used, the time and temperature within the oven is regulated so that when the tape emerges from the opposite end, the coating 22 applied on one surface of the tape is practically cured. By turning the tape over and passing it through the oven a second time, the first side which was coated receives a final cure while the remaining side is being coated and partially cured. The final curing may be effected by subsequent heating, if necessary, whereupon the edges of the coated tape are trimmed. The viscosity of the elastomer and the pressure of the belt apparatus 40 are adjusted so that the coating thickness is relatively uniform throughout the length of the tape and preferably not in excess of about 5 mils as mentioned previously.

While the invention has been described in the preferred embodiment with respect to a coating 22 applied to a fabric tape, it will be appreciated that in its broader aspects, the invention includes, for example, a tape molded from an elastomeric material as depicted in FIGURE 5. Referring to FIGURE 5, a tape T is shown comprising a molded matrix 45 having a plurality of longitudinally extending load bearing strands 47 bonded therein. The matrix 45 is molded from an elastomeric material such as LD–213 suitably modified to be applicable to a molding operation. The elastomer by itself is molded and cured into the shape of the tape T and the arresting load is intended to be carried by the individual strands 47. The molding and curing operation may be accomplished on a continuous extrusion or rolling apparatus, which forms no part of this invention.

Whether the tape is a coated fabric member 10 as shown in FIGURES 3 and 4 or is comprised of a plurality of individual strands 47 bonded into a matrix 45 shown in FIGURE 5, it is essential that the load bearing elements of the tape 23, 47 be of a high strength material having a modulus of elasticity greater than that of the elastomer to prevent cracking or rupture when the tape is placed under load. Also, as more fully explained in U.S. Patent No. Re. 25,406 referred to hereinbefore issued June 25, 1963, the modulus of elasticity of the strands 23, 47 should be sufficiently below that of steel ($12 \times 10^6$ p.s.i.) to allow enough initial stretch, immediately upon engagement by an aircraft and until reel inertia can be overcome, to prevent the initial arresting impact stresses from exceeding the ultimate strength of the steel pendant P. To satisfy these considerations nylon which has a modulus of elasticity of around 300,000 p.s.i. has been found to be a suitable material for the load bearing elements 23, 47, however, other high strength materials may be used instead without departing from the invention.

Having now described a preferred embodiment of the invention it will be appreciated that certain modifications or substitutions may be made by persons skilled in the art without departing from the essential aspects thereof and it is intended that such modifications, substitutions or their equivalents shall be within the scope of the appended claims except insofar as limited by the prior art.

We claim:

1. A tape considerably wider than it is thick and of sufficient length to be coilable on a reel in ever increasing single-stack convolutions having on each of the opposite wide surfaces thereof an elastomeric material having a substantially uniform static, sliding, wet, and dry coefficient of friction of not greater than 0.4 with respect to adjacent tape surfaces.

2. A tape as set forth in claim 1 wherein the elastomeric material has a hardness of at least 40 Durometers on the Shore D scale.

3. A tape as set forth in claim 2 wherein the elastomeric material includes a non-stick slip additive for reducing the coefficient of friction in the cured state.

4. A tape as set forth in claim 1 comprising a fabric inner member including a predominant number of longitudinally extending load bearing strands and a woven protective casing therearound, said elastomeric material being bonded to the casing to form a coating on the opposite wide surfaces of the tape.

5. A tape as set forth in claim 4 wherein the coating is in the order of 5 mils thick.

6. A tape as set forth in claim 4 wherein the load bearing strands have a modulus of elasticity greater than said elastomeric material but not in excess of the accepted modulus of elasticity for steel of $12 \times 10^6$ p.s.i.

7. A tape as set forth in claim 1 formed by molding a matrix of the elastomeric material into the shape of a tape and having a plurality of longitudinally extending load bearing strands bonded therein.

8. A tape as set forth in claim 7 wherein the strands are nylon yarn.

9. A tape as set forth in claim 1 wherein the elastomeric material is a urethane polymer curable below 300° F. and having a hardness of about 70 Durometers on the Shore D scale.

10. In combination with a rotatable reel arresting gear including torsional brake means for controlling reel rotation to absorb the kinetic energy of a landing aircraft, a tape considerably wider than it is thick and sufficiently long so as to be coilable on the reel in ever increasing single-stack convolutions, such that the tape is coiled thereon under minimum tension but is uncoiled under high tension in arresting an aircraft, characterized in having elastomeric outer flat surfaces having a coefficient of friction with respect to adjacent tape surfaces of not greater than 0.4 whereby the tape convolutions tighten smoothly during arrestment.

References Cited

UNITED STATES PATENTS

| | | | |
|---|---|---|---|
| Re. 25,406 | 6/1963 | Byrne et al. | 244—110 |
| 2,898,216 | 8/1959 | Bray et al. | |
| 2,999,764 | 9/1961 | Rhoads | 117—138.8 X |
| 3,093,352 | 6/1963 | Hoffstrom | 244—110 |

MILTON BUCHLER, *Primary Examiner.*

P. E. SAUBERER, *Assistant Examiner.*